Aug. 16, 1949. S. A. SCHERBATSKOY 2,479,518
RECORDING APPARATUS FOR CORRELATING MEASUREMENTS
IN ACCORDANCE WITH DEPTH
Filed March 9, 1945

INVENTOR.
Serge A. Scherbatskoy.
By James Y. Cleveland.

Patented Aug. 16, 1949

2,479,518

UNITED STATES PATENT OFFICE 2,479,518

RECORDING APPARATUS FOR CORRELATING MEASUREMENTS IN ACCORDANCE WITH DEPTH

Serge A. Scherbatskoy, Tulsa, Okla., assignor to Well Surveys, Incorporated, Tulsa, Okla., a corporation of Delaware Application March 9, 1945, Serial No. 581,900

1 Claim. (Cl. 346—33)

This invention relates to electrical exploring or geophysical measuring devices, and more particularly to a bore hole exploring apparatus, which term is used generically in this case to indicate apparatus for making measurements within bore holes such as, for example, electrical logging, radioactivity logging apparatus or other well surveying apparatus. The invention is concerned with the proper control in accordance with depth of apparatus located within a casing which is adapted to be moved through a bore hole and which is closed to withstand the pressures encountered in the hole.

In the case of well surveying apparatus or electrical logging apparatus or the like, it is generally desirable to make measurements within the bore hole of various properties of formations traversed by the hole and correlating these measurements with the depth at which they are made. Examples of these systems are found in the United States Patents to Jakosky, No. 2,038,046, Martiennsen, No. 2,018,080 and others.

In the logging systems of which I am aware, the measuring or indicating is done by instruments located at the surface of the well and it has been necessary to connect the detecting instruments such as ionization chambers, electrodes or antennas in the well to the instruments at the surface by means of one or more electrical conductors. These electrical conductors are very expensive. In order to enable them to withstand wear and tear in the well, lead sheathed cables are usually employed. These are heavy and require large machinery to handle them, as will be apparent when it is recalled that some modern wells are over five miles deep. The power required to lift a lead cable five miles long is considerable.

Other mechanical difficulties, such as the cable breaking or the insulation becoming defective, have been experienced.

Moreover, there are considerable electric losses in a long conductor, especially where separated from the earth only a few inches, as in a well, and these losses have made the currents supplied to the indicating instruments weak and unreliable.

Various arrangements have been designed in the past for logging an oil well or the like in which all conductors between instruments on the surface of the well and those in the well are dispensed with. Those arrangements involved usually lowering measuring and recording instruments on a steel non-conductive cable to various depths within the drill hole, producing records of the measurements performed and correlating these records with the depth at which they are made. One of the commonest methods of correlating the records with depth comprised recording the time when the records were made and simultaneously noting the depths reached at various times. From these data the depths at which the records were made have been determined. However, to coordinate this information with the depth at which the individual records were made, it was necessary to keep a careful check at the surface on the number of individual records which were made and of the depth at which the apparatus was located when they were made so that, when the apparatus was brought to the surface, information as to the particular conditions at any particular depth in the well could be secured by relating the individual records to their corresponding depth. If, for any reason, the apparatus failed to make a record, this fact would not be known and a true coordination would not exist between subsequent records and the depths at which they were made. Accordingly, all doubt as to the accuracy of the method was not removed. It is therefore an object of the present invention to remove this doubt and to provide a method, together with an apparatus suitable for carrying out the method, which enables a ready coordination of the individual records made to the corresponding depth.

Furthermore, by coordinating the measurements performed with the corresponding depths only a very limited information became available, since this information was based only upon a finite number of measurements at various selected depths within the drill hole. For the purpose of correlating, however, two adjoining wells it becomes extremely desirable to obtain continuous logs, since by comparing similarities in the behavior of continuous logs representing adjoining wells it was possible to determine inclinations of various strata traversed by these wells. These continuous logs are in the form of curves that show diagrammatically the continuous variations of a given physical characteristic of the formation, such as radioactivity or electrical resistivity with respect to the depth.

It is the object of the present invention to devise an arrangement for continuously logging an oil well or the like in which all conductors between instruments on the surface of the well and those in the well are dispensed with.

It is a further object of the invention to devise a self-contained unit in which all of the electrical apparatus for logging the well is mounted and adapted to be lowered into the well by some means, such as a steel cable, which can be properly designed for strength and which need not be used as an electrical conductor.

Another object of the present invention is to provide an improved apparatus suitable for manufacture and production for the trade for accomplishing a survey of a well with respect to the vertical.

The invention possesses other advantageous features and objects, some of which with the foregoing will be set forth at length in the following description where I shall outline in full a method of my invention, as well as that form of apparatus for determining the continuous log of a well which I have selected for illustration in the drawings accompanying and forming part of the present specification. In said drawings I have shown one form of apparatus for determining the resistivity of formations traversed by a well, but it is to be understood that I do not limit myself to such form, since the invention, as set forth in the claims, may be embodied in a plurality of forms.

Figures 1, 2:
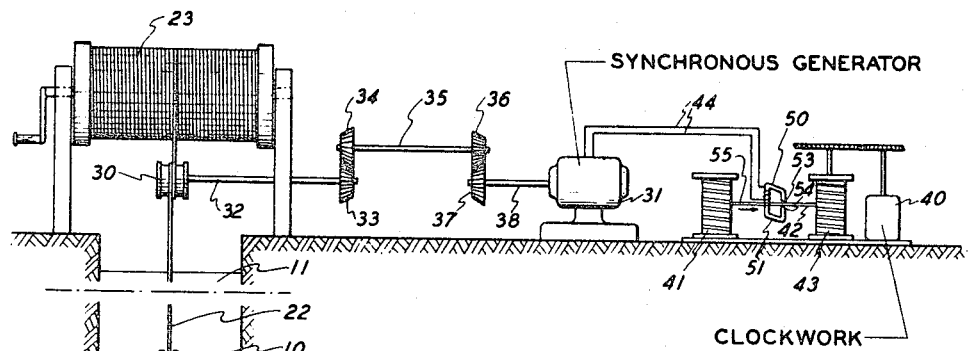
Figure 1 is a section through the apparatus, illustrating the apparatus as positioned with respect to an oil well and showing two recording units for obtaining a record representing the time variations of the measurements performed and another record representing the time variation of the depth corresponding to these measurements.
Figure 2 shows an arrangement for combining the records obtained by means of apparatus of Fig. 1 and deriving therefrom a continuous log of the oil well representing the variations of the measurements performed with respect to depth.

The novel and essential feature of my arrangement consists in providing two recording units operated by clocks, one of which is lowered together with the detecting element into the drill hole and provides a record representing the variation with respect to time of the physical characteristics of the adjoining formations that are detected by means of said element. The other recording unit is positioned at the top of the drill hole and cooperates with the means for lowering the detecting element in order to provide a record representing the variation with respect to time of the various depths reached by the detecting element. Furthermore, I provide an instrumental arrangement located preferably at a central office removed from the area at which the drill hole is located. By means of such an instrumental arrangement both records are translated into a resultant record that represents diagrammatically the variation of the characteristics of the formations traversed by formations with respect to the depth of the drill hole.

An important feature of my invention consists in the use of phonographic recording in conjunction with said two recording units. I have illustrated a magnetic recording as an example of phonographic recording although I consider several other types of recording as a complete equivalent of magnetic recording, such as for instance, variable area, variable density, recording and other types of recording. Heretofore, various measurements in drill holes have customarily been recorded as a visual trace, and in this specification the term "phonographic record" is used to distinguish the records obtained in the utilization of my method from the prior records which are reproducible only in the sense that they may be duplicated by photography or similar process, whereas, the phonographic records obtained herein are reproducible in that they may be used in a reproducer to produce electrical currents and can again be recorded. In other words, the phonographic records referred to herein are adapted for subsequent recreation wherein the recreating system, if desired, may be so adjusted as to modify the output thereof.

Referring now to the drawing in detail and first to the arrangement of Fig. 1, an uncased bore hole 10 containing drill fluid 11 is shown penetrating a formation 12 to be explored. It may be assumed that the bore hole is in an oil field and intended to be a productive well, the fluid 11 consisting of the usual drilling fluid containing a suitable mud, which fluid was left in the hole following removal of the drill. The particular arrangement that I have chosen to illustrate my invention consists in measuring the variation of the resistivity of the formation with respect to depth. In this arrangement two electrodes are lowered through the hole. An electrical current is applied to these electrodes, and as the current traverses the well an electric field is produced in the adjoining formation, which field is impressed on other electrodes hereinafter referred to as potential electrodes. The potential of the potential electrodes is a function of the resistivity of the formation and is recorded in a manner hereinafter described.

The arrangement illustrated in Fig. 1 comprises two recording units, one of which is lowered into the hole to be surveyed and the other of which remains on the earth's surface. The recording unit lowered into the hole is arranged to provide a phonographic record of the variation of the resistivity of the formation with respect to time. The recording unit that remains on the earth's surface is arranged to provide a phonographic record of the vertical motion of the part that is lowered in the hole. Fig. 2 shows an apparatus that utilizes the phonographic records obtained by means of the above two assemblies and produces a resultant record representing the variation of the resistivity of the formations with respect to the depth of the hole.

The assembly that is lowered in the drill hole is preferably enclosed in an elongated cylindrical protective casing preferably of non-corrosive material, such as brass, indicated generally by the reference character 20 and provided at its upper end with an eye 21 adapted to receive a cable 22. The various portions of the casing 20 may be made up by welding or threading together pieces of pipe, to provide a hermetically sealed construction, but for convenience in illustrating the constructions are not shown. The casing should preferably not be over three and one half inches in diameter so that it can be lowered into any conventional size oil well. For this reason the apparatus has to be constructed so that it can be mounted within a small diameter. The cable is preferably of steel which serves as a support for the instrument and need contain no insulated electrical conductors, for in the apparatus herein disclosed it is not necessary to maintain electrical connection between the apparatus on the top of the hole and the apparatus in the hole.

The upper end of the cable 22 is wound on a drum 23 provided with a proper hoisting mechanism and controls to raise and lower the exploring device contained in the casing 20 so that the drum rotates in proportion to the vertical movement of the cable. The cable is unwound from the drum to lower the casing 20 into the hole, and is rewound upon the drum to raise the casing. Between the drum and the hole the cable passes around a spool or drum 30 which functions to rotate a synchronous generator 31 in synchronism with the vertical movement of the casing 20. Thus the spool 30 is shown mounted on a wormshaft 32 bearing a worm 33 which meshes with a wormwheel 34 on one end of a shaft 35 upon the other end of which is mounted a second worm 36 which meshes with a wormwheel 37 mounted on a shaft 38 which turns the synchronous generator 31.

The casing 20 comprises essentially two components, one of said components being a measuring device for producing an electric signal representing resistivity of the formation in the neighborhood of said device, and the other component consisting of a phonographic recording unit for producing a record of said electrical signal. To mount these components in the casing a supporting frame or inner casing 70 is provided. The supporting structure 70 may consist essentially of aluminium tubing or other light weight material with portions cut away to reduce weight and providing a convenient framework, and may be provided with brackets or supporting devices not shown in detail in the drawings. Within the lower portion of the supporting structure designated by numeral 71 is mounted the resistivity measuring apparatus; within the intermediate portion designated by numeral 72 is mounted a magnetic recorder for recording the resistivity measurements and within the upper portion designated by the numeral 73 is mounted a clockwork 103 for driving the magnetic recorder.

The resistivity measuring apparatus is of the type described in U. S. Patent 2,141,826 issued on December 27, 1938 to Conrad Schlumberger and utilizes a source of direct current of high strength which may be for instance a battery of accumulators designated in Fig. 1 by numeral 90. Two current supply electrodes 91, 92 are directly connected to the source of current by fairly short leads, one of said leads comprising a resistor 93. It is apparent that a current passes from one of the supply electrodes into the adjoining formation and returns by the other electrode. In passing through the formation, this current gives rise to potential differences due to the ohmic drop. In particular, the potential difference E which is produced in this way is measured between the two other electrodes, which may be called the potential electrodes and are designated by numerals 94, 95. Under these conditions, it is known that the resistivity of the ground in the neighborhood of the measuring arrangement is given by the formula:

$$P = K \frac{E}{i}$$

in which K is a coefficient which depends solely on the geometrical dimensions of the arrangement used. If A is the electrode 91 from which the current enters the formation, B is the electrode by which it returns from the formation, if M and N are the electrodes 94 and 95 between which the potential difference is measured, and if E represents the potential of the electrode 94 with respect to the electrode 95 then:

$$K = 4\pi \frac{1}{\frac{1}{AM} - \frac{1}{AN} - \frac{1}{BM} + \frac{1}{BN}}$$

in which AM, AN, BM and BN represent the several distances of the two current supply electrodes from the two potential electrodes.

The potential difference E derived from the potential electrodes 94, 95 is amplified in an amplifier 96 and subsequently applied to the magnetic recording unit contained in the intermediate compartment 72. The recording unit consists of a lower rotatable spool 100 having magnetizable steel tape or wire 101 wound thereon, an upper spool 102 and a clock work 103 is provided for winding the steel tape 101 from the spool 100 onto the spool 101. The clockwork 103 is connected by means of suitable gearing such as the worm gears 104 and 105 the shaft 106 and the bevel gears 107, 108 to the shaft 109 of the spool 102. A suitable slippage clutch, not shown, is connected between the shaft 110 and the spool 100 so that a constant strain is placed upon the tape 101 no matter how much tape is wound upon the spool. The clockwork 103 will run at a substantially uniform speed and causes the tape to be moved at a fairly uniform rate thereby.

The movable steel tape is operatively engaged to a recording head 120 that consists of an electromagnet having an iron core 121 and a winding 122 wound around the core. The core 121 is provided with two pole pieces 123, 124 immediately adjacent one to another. The pole pieces are provided with sharp edges in form of knife blades in order to localize within a narrow zone of exploration the flux that passes between them. The narrow air gap is provided between the pole pieces 123, 124. The tape 101 is made to pass through the air gap in such a manner, that the plane of the tape is perpendicular to the line joining the pole pieces 123, 124.

In accordance, therefore, with a specific feature of this invention the output of the amplifier 96 is applied to the winding 122 and produces magnetization of the tape 101 that is in direct proportion to the voltage derived from the potential electrodes 94, 95 and that represents the resistivity of the formation in the direct neighborhood of the electrodes at the instant under consideration. Consequently, the record is made on a very thin slowly moving tape having high magnetic retentivity, by transverse magnetization induced by pole pieces contacting, or nearly contacting either side of the tape directly opposite each other, the pole pieces being made of laminations of magnetic material of high initial permeability, high resistivity and very low retentivity, and being tapered at one end so that the portion adjacent to the tape is in the form of a very thin lamination extending across the tape.

Before the magnetic tape 101 enters the air gap it is assumed to be in demagnetized condition. It is apparent that an extremely small portion of the tape which at a given instant is in direct neighborhood of the pole pieces 123, 124 becomes magnetized in the direction perpendicular to the axis of the tape and to the extent dependent upon the strength of the magnetic flux at the instant under consideration.

It is therefore apparent that as the tape is moved in the direction of the arrow, as described above, it is brought to a very high transverse magnetization by the flux set up in the pole pieces 123, 124. By "transverse magnetization" it is meant that the flux in the tape is in the direction of its thickness. In other words, a tape so magnetized may be thought of as a series of elemental magnets .125 inch wide and .001 inch long, as contrasted with a tape longitudinally magnetized by poles spaced along the tape. In the case of longitudinal magnetization, the flux in the tape is in the direction of its length, i. e., the elemental magnets will have a length equal to the distance apart of the spaced magnet poles, measured along the tape.

It is also apparent that, after this portion of the tape has left the air gap and proceeds in the direction of the arrow towards the spool 102, a subsequent portion of the tape enters the air gap and becomes subsequently magnetized in the direction perpendicular to the tape, and to the extent dependent upon the strength of the magnetic field in the airgap at said subsequent instant. Because of the magnetic retentivity, each element of the tape, after having passed through the air gap, acquires a magnetic moment which is oriented in the direction perpendicular to the tape.

It is therefore apparent that the tape 101 during its motion in the direction of the arrow becomes wound upon the spool 102, and retains a succession of magnetic moments, the distribution of which with respect to the length of the tape has a relationship to the time variation of the electrical voltage derived from the potential electrodes 94, 95. It is therefore apparent, that after the logging of the well is completed, the spool 102 becomes wound with the magnetized tape, and the magnetization impressed on this tape represents the variation of the resistivity measurements that have been performed with respect to time.

Consider now the part of my arrangement positioned at the top of the drill hole that comprises a recording unit for producing a phonographic record of the downward motion of the casing 20. This recording unit is designed to produce a phonographic record of the output of the synchronous generator 31. This assembly consists essentially of a clock mechanism 40 that drives a spool 43, thereby causing a thin magnetic tape 42 initially wound upon the spool 41 to move in the direction of the arrow, thus gradually unwinding itself from the spool 41 and winding itself upon the spool 43. The output leads of the synchronous generator 31 are applied to a recording head 50 that is operatively engaged to the tape 42 for magnetically impressing the signals derived from the generator 31 upon the tape 42.

The recording head 50 consists of an electromagnet having an iron core 51 and a winding 52 wound around the core 51. The core 51 is provided with two pole pieces 53, 54 immediately adjacent one to another. The pole pieces are provided with sharp edges in form of knife blades in order to localize within a narrow zone of exploration the flux that passes between them. The narrow air gap is provided between the pole pieces. The tape 55 is made to pass through the air gap in such a manner, that the plane of the tape is perpendicular to the line joining the pole pieces 53, 54.

In accordance, therefore, with a specific feature of this invention, the record is made on a very thin slowly moving tape having high magnetic retentivity, by transverse magnetization induced by pole pieces contacting, or nearly contacting either side of the tape directly opposite each other, the pole pieces being made of laminations of magnetic material of high initial permeability, high resistivity and very low retentivity, and being tapered at one end so that the portion adjacent to the tape is in the form of a very thin lamination extending across the tape.

Before the magnetic tape 55 enters the air gap, it is assumed to be in demagnetized condition. It is apparent, that an extremely small portion of the tape which at a given instant is in direct neighborhood of the pole pieces 53, 54, becomes magnetized in the direction perpendicular to the axis of the tape and to the extent dependent upon the strength of the magnetic flux at the instant under consideration.

It is therefore apparent that as the tape is moved in the direction of the arrow, as described above, it is brought to a very high transverse magnetization by the flux set up in the pole pieces 53, 54. By "transverse magnetization" it is meant that the flux in the tape is in the direction of its thickness. In other words, a tape so magnetized may be thought of as a series of elemental magnets .125 inch wide and .001 inch long, as contrasted with a tape longitudinally magnetized by poles spaced along the tape. In the case of longitudinal magnetization, the flux in the tape is in the direction of its length, i. e., the elemental magnets will have a length equal to the distance apart of the spaced magnet poles, measured along the tape.

It is also apparent that, after this portion of the tape has left the airgap and proceeds in the direction of the arrow towards the spool 43, a subsequent portion of the tape enters the airgap and becomes subsequently magnetized in the direction perpendicular to the tap, and to the extent dependent upon the strength of the magnetic field in the airgap at said subsequent instant. Because of the magnetic retentivity, each element of the tape, after having passed through the air gap, acquires a magnetic moment which is oriented in the direction perpendicular to the tape.

It is therefore apparent that the tape 55 during its motion in the direction of the arrow becomes wound upon the drum 43. and retains a succession of magnetic moments, the distribution of which with respect to the length of the tape has a relationship to the time variation of the voltage, derived from the output of synchronous generator 31.

It is apparent that the alternating voltage derived from the output leads 44 of the synchronous generator 31 has a frequency $f$ that is in direct proportion to the speed of rotation of the shaft 38, and is, therefore, in direct proportion to the lineal downward speed $v$ of the casing 20, i. e., $$f = kv$$

where $k$ is a coefficient of proportionality. Since the lineal speed of the magnetic tape 55 driven by the clockwork 40 is constant, the frequency of the lineal distribution of the impressed signal increases when the lineal speed $v$ of the casing increases, and conversely, the frequency of the lineal distribution of the significant signal decreases when the lineal speed of the casing decreases. Consequently, while the recording process progresses, the significant signal distributes itself sinusoidally upon the moving tape at a lineal frequency that is modulated in proportion to the speed of the casing. By lineal frequency we designate the number of alternations of the signal that is recorded lengthwise upon the unit of length of the tape. The voltage impressed upon the recording head 50 has a time frequency $f$, i. e., it varies $f$ times per second, and, therefore, each cycle of this voltage will distribute itself over a length of tape equal to $v/f$ cm. Or, in other terms each centimeter of tape will contain $f/v$ cycles. Therefore, a voltage having a time frequency of $f$ cycles per second will impress itself upon the moving tape as a signal, having a lineal frequency of $f/v$ cycles per centimeter.

It is now apparent, that the faster is the lineal downward speed of the casing 20, the higher is the lineal frequency of the signal impressed magnetically upon the moving tape, i. e., the higher is the number of alternations of said signal impressed upon the unit of length of said tape. Consequently, when the recording process progresses, the frequencies distribute themselves upon the moving tape at corresponding lineal frequencies, that are proportional to the speed of the casing 20. Therefore, the lineal distribution of the magnetically impressed signal with respect to the length of the tape is very much affected by the variation of the lineal speed of the casing 20.

Consider now Fig. 2, that represents an arrangement that utilizes the magnetic tape 101 and tape 55 obtained by means of the recorders of Fig. 1. The tape 101 represents a magnetic record of the variation of the resistivity measurements with respect to time and the tape 55 represents a magnetic record of the depth variations that are associated with the resistivity measurements. The tape 55 is initially wound upon the spool 200 and is adapted to be unwound from spool 200 and wound upon the spool 201 by the rotation of the shaft 202 driven by a clockwork 203. The tape 101 is initially wound upon the spool 205 and is adapted to be unwound from the spool 205 and wound upon the spool 206 by the rotation of the shaft 207. The spool 200 is shown mounted on a shaft 208 bearing a wormwheel 209 which meshes with a wormwheel 210 on one side of the shaft 207 upon which is mounted the spool 206. Consequently, by driving the shaft 202 by means of the clockwork 203 the whole assembly comprising the shaft 202, 208, 207 and 211 is set into motion, thus causing the tapes 55 and 101 to move linearly at equal speeds in direction of the arrows.

The usual reproducing heads 220 and 221 are associated with the tapes 55 and 101 at points between the two spools 200, 201 and 205, 206 respectively. At the initial instant, the magnetized tapes 55, 101 are completely wound upon the spools 200 and 205 respectively The signals impressed thereon are reproduced by progressively unwinding the spools 200 and 205 whereby the tapes 55 and 101 are made to move past the reproducing heads 220 and 221 and become progressively wound upon the spools 201 and 206, respectively.

The log of the drill hole, i. e., the compound graph representing the variation of resistivity of the formations traversed with respect to depth is produced upon a photosensitive record film 230 that is unwound from the drum 231 and wound upon the drum 232. A galvanometer mirror 233 positioned adjacently to the record film 230 is adapted to reflect a beam of light from the lamp 234 into the film 230 to produce thereon a curve 235 representing the log of the drill hole. The mirror 233 is carried by a galvanometer coil 236 which is connected to the output terminals of an amplifier 237, the input terminals of said amplifier being connected to the reproducing head 221.

The unwinding of the drum 231 and the simultaneous winding of the drum 232 is effected by means of a synchronous motor 250, said synchronous motor being energized by current derived from the reproducing head 220 and amplified in the amplifier 238.

The reproducer head 220 is structurally similar to the recording head of Fig. 1. In particular, the reproducer head 220 consists of an electromagnet having an iron core 240 and a winding 241 wound around the core 240. The core 240 is provided with two pole pieces 242, 243 having a form of two relatively sharp edges and immediately adjacent one to another. A narrow air gap is provided between the pole pieces 242, 243. The tape 55 is made to pass through the air gap in such a manner that the plane of the tape is perpendicular to the line joining the pole pieces 242, 243. Similarly, the reproducer head 221 consists of an iron core 244 having two pole pieces 245, 246 and provided with a winding 247. The tape 101 is made to pass through the air gap between the pole pieces 245, 246 in such a manner that the plane of the tape is perpendicular to the line joining the pole pieces.

In the manner shown, the pole pieces 242, 243 will each supply a convenient magnetic path for the changing flux resulting from the passage of the magnetized tape and cause this flux to pass through the associated coil 241. It is apparent that the reference signal impressed magnetically upon the tape 55 is being reproduced in form of currents in the output of the reproducing head 220. It has been assumed that the signal impressed magnetically upon the tape 55 has been obtained by means of the arrangement of Fig. 1 and represents the lineal speed of the casing 20 during the downward motion of the casing within the drill hole at the time when the resistivity measurements of the adjoining formations were performed:

Assume that at a given instant the downward lineal velocity of the casing 20 was $v$; the frequency of the corresponding signal impressed magnetically upon the tape 55 was $f=kv$. Consequently, during the process performed in connection with the arrangement of Fig. 2 we obtain across the output terminals of the winding 220 a current having the frequency $f$.

Assume now that an instant later the lineal speed of the casing 20 has departed from the value $v$ cm./sec. which corresponded to the speed during the instant at which it received the magnetic impressions by means of the instrument of Fig. 1. Let the new speed of the casing at this later instant be $(v+\Delta v)$ cm./sec., where $\Delta v$ cm./sec. represents the increment of the lineal speed of the casing 20, as compared to the linear speed of the casing during the previous instant. The value of $\Delta v$ may be either positive or negative. We obtain them across the output terminals of the winding 220, a signal the frequency of which has been shifted upwards or downwards (depending upon the sign of $\Delta v$). The value $\Delta v/v$ is assumed to be always small comparing to one.

Thus, whenever the departure of speed of the casing 20 from the value $v$ cm./sec. to a new value $(v+\Delta v)$ cm./sec. occurs, the signal derived from the reproducing head 220 undergoes a corresponding frequency change. The modified frequency is transmitted through the amplifier 238 and applied to the synchronous motor 250, thus causing the motor 250 to run at a correspondingly modified speed. If $\Delta v$ is positive, the speed of the motor tends to increase, and, on the other hand, if $\Delta v$ is negative, the speed of the motor tends to decrease. Therefore, we obtain across the output terminals of the winding 241 reference signal having the frequency that varies in direct proportion to the lineal speed of the casing 20 during the recording process.

Consider now the synchronous motor 250. This motor is energized continuously by the output of the winding 241, and, consequently, the speed of this motor is proportional to the frequency derived from the reproducer head.

The essential feature of the device consists in controlling the speed of the synchronous motor 250 in a definite relationship to the signal impressed magnetically upon the tape 55, i. e., in a definite relationship to the vertical lineal motion of the casing 20 during the well surveying process performed by means of the arrangement of Fig. 1. The speed control of the motor 250 is based upon the assumption that the lineal frequency of the signal impressed magnetically upon the tape 55 represents the speed variation of the vertical motion of the casing 20. Therefore, by utilizing the recordings upon the tape 55 I am capable of reproducing the speed variation of the casing 20 and impart these speed variations upon the shaft 260 driving the drum 232, and consequently produce a lineal motion of the the sensitized paper in the direction of the arrow that is essentially a replica of the lineal motion of the casing 20.

In the manner shown the pole pieces 245, 246 will each supply a convenient magnetic path for the changing flux resulting from the passage of the magnetized tape 101 and cause this flux to pass through the associated coil 221. This changing flux generates a voltage in the coil 221. It is apparent that this voltage gives the exact measurements of the resistivity measurements performed by means of the apparatus of Fig. 1, said resistivity measurements being represented by the voltage that has been derived from the potential electrodes 94, 95 that has been impressed upon the magnetizable tape in accordance with the well logging process described in connection with Fig. 1. This voltage becomes subsequently amplified in the amplifier 238 and applied to the oscillograph. The oscillograph is of electro-optical type wherein a beam of light is directed upon a travelling sheet of photographically sensitized paper or film, and is adapted to modify the light in accordance with the instantaneous amplitude of the voltage derived from the reproducing head so as to produce a record trace on the paper corresponding to the voltage derived from the recording head. In the form of oscillograph shown in Fig. 2 the signal derived from the reproducer head and representing the resistivity of formation is applied to a delicate coil of wire mounted between the poles of a permanent magnet and carrying a mirror interposed between a lamp 234 and the paper 230 in such an arrangement that on twisting of the coil due to applied signal energy from the reproducer head the mirror bends the beam of light to varying degrees depending upon the instantaneous signal strength and thereby produces a wavy trace on the paper 235. Such a wavy trace or line represents the variation of the resistivity of the formation traversed by the drill hole. Since the paper is driven longitudinally in synchronism with the vertical motion of the exploring instrument, the trace is a compound indication showing a relationship between two coordinates. One of the coordinates is along the longitudinal direction and is the depth coordinate. The other coordinate is in the direction which is transverse to the paper strip and represents the resistivity of the formations corresponding to various depths.

I claim:

A system for producing a log of the formations penetrated by a drill hole that comprises means for producing adjacent the formations electrical signals that are a function of the physical properties of the formations, means for simultaneously producing separate electrical signals that are related to the depth of the formations adjacent which the first recited electrical signals are produced, means for separately and independently recording the two sets of signals as they are produced in correlation with time, means for separately and simultaneously reproducing said signals in correlation with a time schedule equal to that employed in recording the signals, means utilizing one set of the reproduced signals to operate a recorder record strip, means for simultaneously utilizing the second set of electrical signals for tracing a record on the recording strip which record will be a function of the speed at which the recorder strip is driven, whereby there results a log of the physical formations correlated with depth.

SERGE A. SCHERBATSKOY.

REFERENCES CITED

The following references are of record in the file of this patent:

UNITED STATES PATENTS

| Number | Name | Date |
| --- | --- | --- |
| 2,167,630 | Bazzoni et al. | Aug. 1, 1939 |
| 2,230,502 | Pearson | Feb. 4, 1941 |
| 2,371,628 | Krasnow | Mar. 20, 1945 |